Jan. 5, 1926.
F. A. MILLER
1,568,565
TRANSMISSION BAND
Filed July 28, 1924
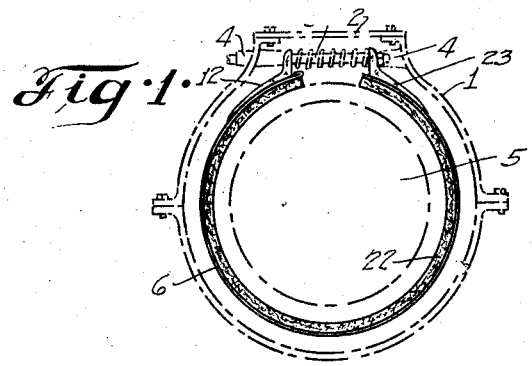
Fig·1·
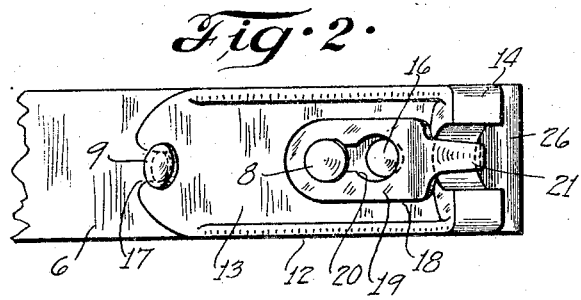
Fig·2·
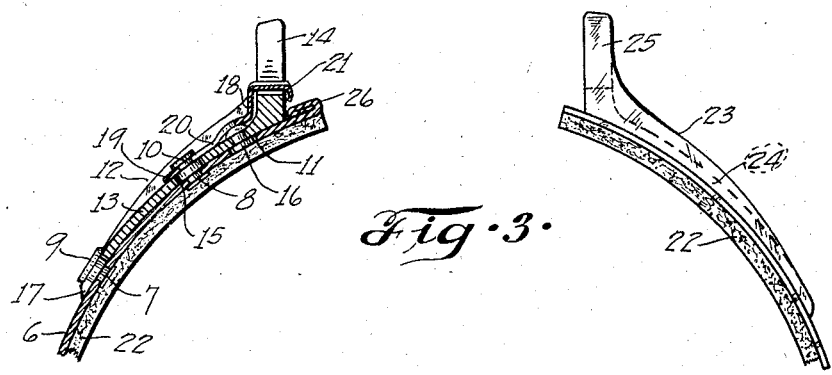
Fig·3·
INVENTOR
Fred A. Miller.
BY
ATTORNEY Patented Jan. 5, 1926.

1,568,565

UNITED STATES PATENT OFFICE.

FRED A. MILLER, OF ST. LOUIS, MISSOURI, ASSIGNOR OF ONE-HALF TO DAVID E. PARKS AND ONE-HALF TO WALTER T. BOHNE, BOTH OF ST. LOUIS, MISSOURI.

TRANSMISSION BAND.

Application filed July 28, 1924. Serial No. 728,606.

*To all whom it may concern:*

Be it known that I, FRED A. MILLER, a citizen of the United States, residing at the city of St. Louis, State of Missouri, have invented a certain new and useful Improvement in Transmission Bands, of which the following is a specification, reference being had to the accompanying drawing, forming a part thereof.

This invention relates generally to automobiles and, more particularly, to a certain new and useful improvement in automobile transmission bands.

Considerable trouble, inconvenience, and expense accompany today, so far as I am aware, the removal and repair or replacement of worn or broken transmission bands of especially automobiles of a certain type; and it is the chief object of my present invention to provide a transmission band especially adapted for use in connection with automobiles of the type mentioned which is of simple and efficient form and construction and which is detachable or removable for repair or replacement with ease, convenience, and little expense.

With the above and other objects in view, my present invention resides in the novel features of form, construction, arrangement, and combination of parts hereinafter described and pointed out in the claims.

In the accompanying drawing,

Figure 1 is a side elevational view of a transmission band embodying my invention, illustrated in connection with a transmission-case of an automobile of present well-known construction;

Figure 2 is an enlarged fragmental plan view of the band; and

Figure 3 is a fragmental view of the band partly in side elevation and partly in longitudinal section.

Referring now more in detail and by reference characters to the drawing, I have, for the purpose of illustrating a practical embodiment of my invention, shown the band in connection with a standard automobile construction of which 1 is the transmission-case having the usual removable lid or cover 2, 3 the band-engaging pedal-actuated clutch and slow-speed shaft, 4—4 the bearings for the shaft 3, and 5 one of the gear-drums.

The band proper 6 is constructed of suitable spring steel and is of the usual split-ring form. Fixed in suitably spaced so-called tandem relation upon the outer face of one end portion of the band 6, is preferably a pair of upstanding studs 7, 8, the former having a head 9 and the latter having an annular groove 10 intermediate its ends; and formed in band 6 preferably intermediate the stud 8 and the adjacent end of the band, is an aperture or recess 11, all for purposes shortly appearing.

Adapted for co-operation with band 6, is what I designate as an ear 12, which includes a rigid shank 13 arcuated longitudinally to conform to the normal curvature of the end-portion of band 6, and a bifurcated or notched head 14 angularly upstanding from the forward end of shank 13, as best seen in Figures 1 and 2. Within its length, the ear-shank 13 is formed or provided with an aperture or opening 15 adapted to accommodate the band-stud 8, and upon its under face the ear-shank 13 is provided with a projecting short pin or stud 16 adapted to removably fit snugly within the band-aperture or recess 11. At its end opposite the head 14, the ear-shank 13 is preferably reduced in thickness and longitudinally notched, as at 17, for detachable or removable engagement with the headed-stud 7 of the band.

Adapted for ear-securing engagement with the band 6 and ear 12, is a so-called detachable latch 18, best seen in Figure 2, which, as there shown, includes a body-portion 19 of dimensions and suitably lengthwise arcuated and shaped to fit smoothly upon the upper face of shank 13 and formed with a so-called key-hole slot 20 for co-operative engagement with the band grooved-stud 8. At its one or so-called forward end, and it will be noted that the smaller or reduced portion of its slot 20 is disposed away from such end, the latch 18 is reduced in width, bent, and extended, as best seen in Figures 2 and 3, into the form of a hook-projection 21 adapted for somewhat sprung engagement with the ear 12 at the base or bight of its notched head 14 when the latch body-portion 19 is in engagement at the reduced portion of its slot 20 with the band-stud 8.

Disposed upon the inner face of band or ring 6, is the usual lining 22, and riveted or otherwise fixed upon the outer face of the band 6 and upon its other or opposite end, is a second ear 23 likewise including a suitably longitudinally arcuated shank 24 and an angularly-disposed bifurcated or notched head 25 substantially similar to and for co-operation with head 14 of ear 12.

In use or operation, and in assembling the transmission, case-cover 2 is removed, and a band 6 having a fixed ear 23 is disposed within the case 1 and around the drum 5. An ear 12 is then disposed upon the band 3, as seen in Figures 2 and 3, with its notched end 17 in engagement with headed-stud 7 and its stud 16 in the band-aperture 11, band-stud 8 then projecting upwardly through its shank accommodating aperture or opening 15.

A latch 18 is then disposed upon the shank 13 of ear 12 with its hook-end 21 presented toward the ear-head 14 and engaging at the larger portion of its slot 20 with the band-stud 8. The latch 18 is then slidably moved or actuated longitudinally toward the ear-head 14, whereupon the latch 18 engages at the reduced portion of its slot in the groove 10 of stud 8 and its hook-extension 21 is sprung into securing engagement with the ear 12 at the bight of its head 14, the ear 12, as so mounted and secured, being rigidly and firmly held against both lateral and longitudinal movement upon or relatively to the band and in co-operative relation with the head 25 of the opposite ear 23 previously fixed upon the band. The band is then engaged at its ears 12 and 23 with its actuating mechanism, that is to say, its drum clutching and release mechanism, including the shaft 3, which is disposed through the notches of the heads of the ears and over the latch 18, as seen in Figure 1, said shaft then functioning also to prevent accidental displacement of the ear-securing latch 18.

Should later the lining 22 become worn or the band 6 otherwise require repair or replacement, the case-cover 2 only is removed, the shaft 3 of the ear-actuating mechanism removed, and the latch 18 suitably disengaged, when the detachable ear 12 may be conveniently lifted from the band and the band pulled endwise at its fixed ear 23 from around its encircled drum 5.

My new band is simple in form and construction, may with ease and convenience be included in the assembly or removed for repair or replacement, and greatly facilitates the inexpensive repair and correction of transmission troubles arising from worn or defective bands.

Preferably the band 6 at the end thereof equipped for engagement with the detachable ear 12 is suitably bent or doubled upon itself, as at 26, to provide or form a pulling point, in addition to the studs 8 and 11, for the ear 12 upon the band in the contracting actuations of the band into clutching engagement with its encircled drum 5; and it is to be understood that changes in the form, construction, arrangement, and combination of the several parts of my new band may be made and substituted for those herein shown and described without departing from the nature and principle of my invention.

Having thus described my invention, what I claim and desire to secure by Letters Patent is:

1. An automobile transmission-band comprising, in combination, a split ring, an ear having a notched head and an apertured shank, said shank being arcuated to conform to the curvature of the ring and the ring being adapted at its shank to removably fit upon the ring, an annularly grooved stud on the band projecting through the aperture of the shank, and a detachable latch-member for removably securing the ear to and upon the band, said latch-member having a key-hole slot for engagement with the stud at its groove and a hook-extension for engagement with the ear at its head.

2. An automobile transmission-band comprising, in combination, a split ring, an ear having an apertured shank arcuated to conform to the curvature of the ring and adapted at its shank to removably fit upon the ring, a stud upon the band projecting through the aperture of the shank, and a locking-member for removably securing the ear to and upon the band, said locking member being adapted for slidable engagement over said shank with said stud and having a yielding extension adapted for sprung engagement with the ear.

3. An automobile transmission-band comprising, in combination, a split-ring having an upstandng stud, an ear having a notched head and a shank apertured intermediate its ends, the latter being adapted to fit upon the ring and being notched at an end for engagement with said stud, an annularly grooved second stud on the band projecting through the aperture of the shank, and a latch-member for removably securing the ear to and upon the band, the latch-member having a key-hold slot for slidable engagement with said second stud and a hook-extension for sprung-engagement with the ear at the bight of its head.

In testimony whereof, I have signed my name to this specification.

FRED A. MILLER.